United States Patent [19]
Gernhardt et al.

[11] 3,778,016
[45] Dec. 11, 1973

[54] ARTICLE MOUNT

[75] Inventors: Paul D. Gernhardt, Raytown, Mo.; Charles A. Slater, Jr., Overland Park, Kans.

[73] Assignee: Peterson Manufacturing Company, Grandview, Mo.

[22] Filed: Oct. 24, 1972

[21] Appl. No.: 299,796

[52] U.S. Cl. ............................................. 248/475 R
[51] Int. Cl. ............................................. B60r 1/06
[58] Field of Search ................... 248/475 R, 475 A, 248/475 B, 476, 477, 478, 479, 480, 481, 482, 483, 484, 485, 486; 350/307

[56] References Cited
UNITED STATES PATENTS

| | | | |
|---|---|---|---|
| 2,860,546 | 11/1958 | Bolser | 248/477 |
| 3,259,349 | 7/1966 | Lee | 248/480 |
| 3,482,811 | 12/1969 | Zent | 248/485 X |
| 3,729,163 | 4/1973 | Cummins | 248/487 |

*Primary Examiner*—William H. Schultz
*Attorney*—Claude A. Fishburn et al.

[57] ABSTRACT

A rear view mirror support having a mounting structure for supporting a rear view mirror in spaced relation from a vehicle front fender. The mounting structure is comprised of arm members connected together and having mounting members secured to same for engaging portions of a vehicle front fender. A tensioning member is secured to and extends between the arm members for holding the mounting members in engagement with the fender by applying force to the arms.

11 Claims, 5 Drawing Figures

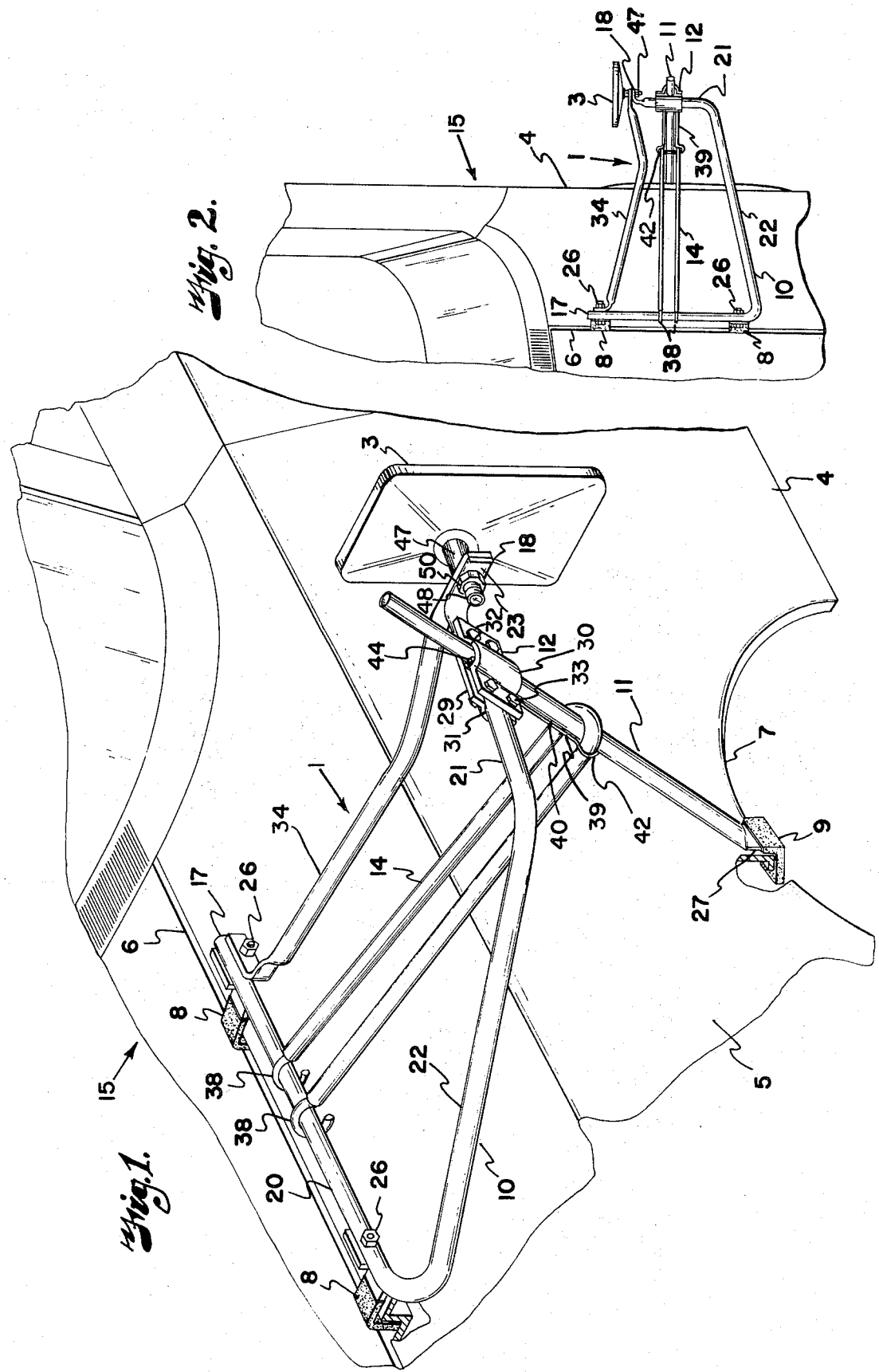

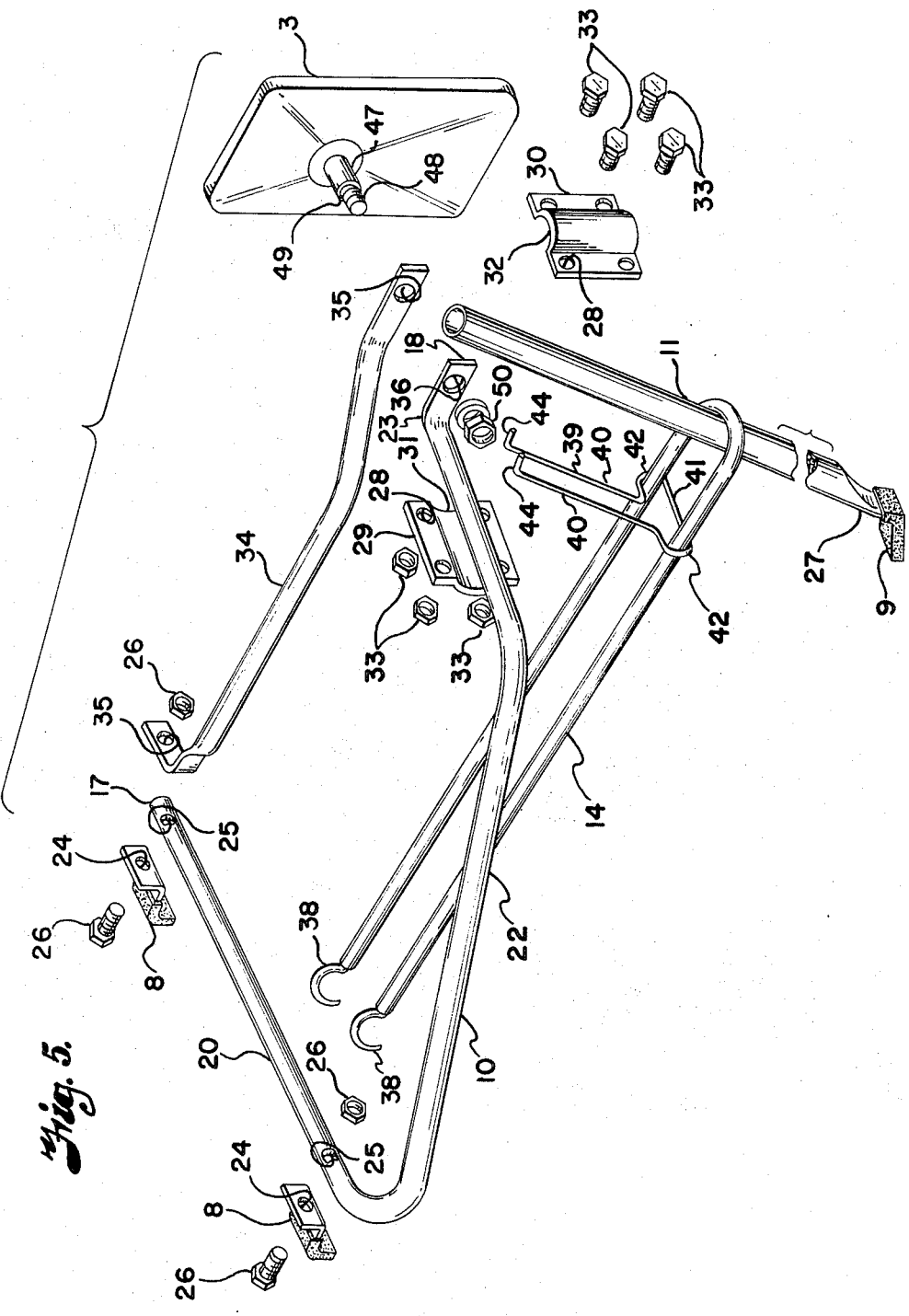

ARTICLE MOUNT

The principal objects of the present invention are: to provide a rear view mirror support, for mounting on a vehicle front fender, having upper and lower rigid arms with spaced apart ends and pivotally connected together, said arms engaging said fender with one arm having a rear view mirror mounted thereon; to provide such a structure that is lightweight that will rigidly support a rear view mirror without vibrating; to provide such a structure that can be temporarily mounted on a vehicle whereby the mirror is in spaced relation from a side of the vehicle; to provide such a structure wherein the center of air resistance of the mirror is in a common plane with mounting members that are secured to the upper arm thereby reducing or eliminating objectionable rotating moments due to air resistance of the mirror; to provide such a structure wherein the mirror is adjustable to a position below the user's horizontal field of vitw thereby eliminating blind spots; to provide such a structure that can be used on both sides of a vehicle and mounted on the front fenders so that opening of the vehicle doors will not cause the mirror to move; to provide such a structure that is suitable for its intended use; and to provide such an article mount that is quickly and easily mounted and removed, sturdy in construction, light in weight and durable.

Other objects and advantages of the present invention will become apparent from the following description taken in connection with the accompanying drawings wherein are set forth by way of illustration and example certain embodiments of this invention.

FIG. 1 is a partial persPective view of a vehicle at the left hand front fender with a rear view mirror support embodying the feature of the present invention with portions broken away to show details of the connection of the mirror support to the fender.

FIG. 2 is a plan view of an article mount connected to a fender.

FIG. 5 is an exploded view of an article mount.

Figure 4:
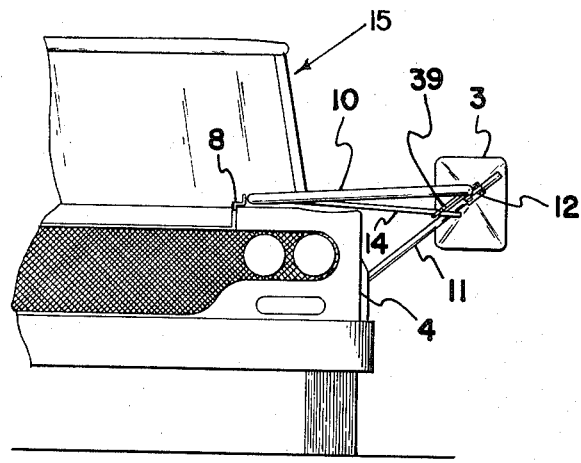
FIG. 4 is a front elevational view of an article mount connected to a fender with the fender section to show details of the mounting.
Figure 3:
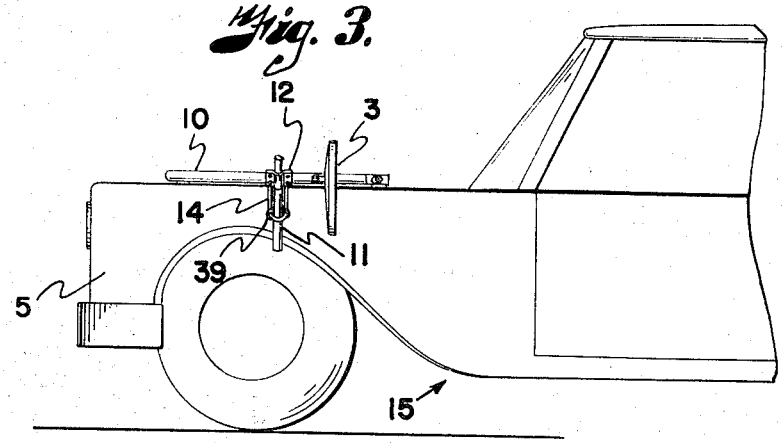
FIG. 3 is a partial side elevational view of an article mount connected to a fender.

Referring more in detail to the drawings:

As required, detailed embodiments of the invention are disclosed herein, however, it is to be understood that these embodiments are merely exemplary of the invention which may be embodied in many forms that are different from the illustrative embodiments presented herewith. Therefore, specific structural and functional details disclosed herein are not to be interpreted as limiting, but merely as a basis for the claims actually defining the scope of this invention.

The reference numeral 1 designates generally an article mount or support wherein an article 3 such as a rear view mirror is supported by a wall structure 4 and is in easily removable relation thereto. The wall structure 4 has a surface 5 with members or edges forming generally opposed abutments 6 and 7 with one of the abutments preferably above the other. The article mount 1 has mounting or securing members 8 and 9 that engage respective abutments 6 or 7 securing the article mount 1 to the wall 4.

The article mount 1 is comprised of a frame means or arm 10 extending laterally from the wall 4 and a brace arm 11 extending upwardly from the abutment 7, the arms 10 and 11 are connected together outwardly of the surface 5 by a connector member 12. A tensioning member 14 is connected to and extends between the arms 10 and 11 applying force thereto urging the securing members 8 and 9 into engagement with the respective abutments 6 and 7 for holding the article mount 1 in secured relation to the wall structure 4 thereby holding the mirror 3 in spaced relation to the surface 5. In the illustrated structure, the wall 4 is the left hand front fender of a vehicle 15. As illustrated, the upper abutment 6 is a portion of the fender adjacent to the hood of the vehicle 15 and the abutment 7 is an edge of the fender 4 defining a wheel well adjacent to the front tire.

In the structure illustrated, the arm 10 has ends 17 and 18 and is a tubular member bent into a genrally U-shaped configuration forming spaced legs 20 and 21 and a bight portion 22 therebetween. The legs 20 and 21 are in generally parallel relation and are angularly disposed to the bight 22. An end portion 23 of the arm 10 adjacent the end 18 is flattened and is bent to be generally normal to the leg 21 and extends outwardly away from the surface 5.

The securing members 8 preferably are flat strips that have two generally right angle bends therein, forming flanges thereon that extend in opposite directions from the center portion thereof. The mounting or securing members 8 are positioned in spaced apart relation and suitably secured to the leg 20. One of the flanges of each securing member has an aperture 24 therethrough that is aligned with a respective aperture 25 through the leg 20 and receives a securing device 26 such as a screw and nut or rivet for securing the securing members 8 to the arm 10.

As illustrated, the arm 11 has opposite ends, one of which has a flat portion 27. Preferably the arm 11 is a tubular member and the flattened end 27 has a bend or hook therein so that a portion of the flattened end 27 is angularly disposed to the arm 11 forming a hook shaped securing member 9 for engaging the abutment 7.

The connector member 12 engages both arms 10 and 11 and holds same together and selectively allows the arm 10 and 11 to be moved relative to one another. In the structure illustrated, the connector member 12 is comprised of two bracket plates or members 29 and 30 that are substantially identical, each having an elongate channel 31 and 32 respectively formed therein extending the length thereof. Each of the channels 31 and 32 are of sufficient depth and width to allow the respective leg 21 of the arm 10 and the arm 11 to rest therein and when the bracket plates 29 and 30 are suitably urged into engagement with one another the arms 10 and 11 are held in frictional engagement with the connector member 12 thereby holding same in fixed relation. Each of the bracket plates 29 and 30 have on opposite sides of the respective channels 31 and 32 apertures 28 through flanges that extend outwardly of each of the channels 31. The apertures of the bracket plates 29 and 30 are brought into alignment and suitable securing devices 33 such as screws and nuts extend therethrough to urge or hold the bracket plates 29 and 30 together when tightened and selectively allow relative movement of the arms 10 and 11 when loosened.

An elongate brace 34 extends between and is suitably secured to the end 18 and leg 20 of the arm 10 to increase the rigidity of the arm 10 and help prevent vibration of the rear view mirror 3. In the form illustrated, the brace 34 is a tubular member having opposite ends that are flattened and have apertures 35 therethrough adjacent to each end. The brace 34 is bent suitably so that the aperture 35 though each end is brought into alignment with the aperture 25 through the arm 10 adjacent the end 17 and an aperture 36 through the arm 10 adjacent the end 18. One end of the brace 34 is secured to the arm 10 adjacent the end 17 by the securing device 26. The aperture 35 through the other end of the brace 34 is aligned with the aperture 36 through the end 18 of the arm 10.

A tensioning or resilient member 14 is appropriately secured to and extends between the arm 11 and the leg 20 of the arm 10. Tension in the resilient member 14 applies force to the arm 10 and 11 and aids it holding the securing member 9 of the arm 11 in engagement with the abutment 7 and the securing members 8 in engagement with the abutment 6. As illustrated, the tensioning member 14 is an elongate resilient member having two ends with hook members 38 suitably secured thereto. The hooks 38 are secured over the leg 20 and the tensioning member 14 extends around the arm 11 applying the force thereto.

In the structure illustrated, an elongate bracket 39 is suitably secured to the connector member 12 and positioned adjacent to the arm 11. Preferably, the bracket 39 is generally U-shaped having spaced apart legs 40 and a bight portion 41 therebetween. The legs 40 are bent adjacent to the bight forming laterally extending enlarged portions 42 that extend outwardly of opposite sides of the arm 11 forming an eyelet on each side thereof. The tensioning member 14 passes through each eyelet and around the arm 11 thereby preventing the tensioning member 14 from moving therealong and locating the point of engagement between the arm 11 and tensioning member 14. The legs 40 extend upwardly through the connector member 12 and terminate in hooks or bent portions 44 that engage the uppermost edge of the connector member 12 preventing accidental withdrawal therefrom. The bracket 39 is selectively movable along the arm 11 to position the point of engagement between the arm 11 and tensioning member 14. The bracket 39 is held in the selected position by suitable engagement with the connector member 12 and the arm 11 when the bracket plates 29 and 30 are secured together.

The rear view mirror 3 in the structure illustrated is of generally standard construction having a securing device 47 pivotally mounted on the back side thereof for securing the mirror to the article mount 1. The securing device 47 preferably has a threaded end portion 48 extending through the aligned apertures 35 and 36 and a shoulder 49 to engage the brace 34. A nut 50 threadably engages the threaded portion 48 and secures the mirror 3 to the arm 10 and brace 34. Preferably the securing device 47 has a ball member, on the end opposite the threaded end 48, that frictionally engages a corresponding socket secured to a portion of the mirror forming a ball joint so that the rear view mirror 3 can pivot relative to the securing device 47 and rear view mirror support 1 and remain in the selected position. One of the features of the present invention is that the center of air resistance of the rear view mirror 3 is coplanar with securing members 8 so that when air gusts from passing vehicles or the wind moving by the rear view mirror 3 is resisted thereby, there is a minimum or no rotating moments introduced into the overall structure as viewed from the side of the vehicle 15.

Preferably, in the form of the invention illustrated the securing members 8 and 9 contacting the abutments 6 and 7 respectively are coated or encased in a soft resilient material so that when the rear view mirror support 1 is secured to the vehicle 15 the finish or paint thereon will not be marred or scratched by the securing members 8 and 9.

The rear view mirror support 1 is constructed so that with a minimum of part rearrangement it can be secured to either side of the vehicle 15. The necessary part rearrangement includes rotating each securing member 8 approximately one-half (½) revolution about its respective securing device 26 and the arm 11 and connector member 12 are secured to the arm 10 to project generally upwardly substantially as it does when mounted on the opposite side of the vehicle. With the parts rearranged the rear view mirror support 1 can be mounted on the opposite side of the vehicle 15.

In operation, the securing members 8 are inserted in the opening between the hood and fender of the vehicle 15 to engage the abutment 6 and the securing member 9 is brought into engagement with the abutment 7. The arms 10 and 11 are moved relative to one another until the rear view mirror 3 is in the desired vertical position. The bracket 39 is moved relative to the arm 11 to the desired position of engagement between the tensioning member 14 and the arm 11. The securing devices 33 are then tightened to bring the bracket plates 29 and 30 of the connector member 12 into engagement to hold the arms 10 and 11 and the bracket 39 into secured relation. The tensioning member 14 passes through the eyelets formed by the enlarged portions 42 of the bracket 39 and the arm 11 and wraps around the arm 11. The hooks 38 on the ends of the tensioning member 14 are hooked or secured over the leg 20 of the arm 10 stretching the tensioning member 14 and placing same in a tensioned condition. The tension in the tensioning member 14 tends to force the securing member 9 toward the securing members 8 and also tends to rotate the rear view mirror support 1 about the point of engagement between the securing members 8 and the abutment 6, thereby holding the securing members 8 and 9 in engagement with the respective abutments 6 and 7. It is to be noted that the rear view mirror support 1 is also adapted for mounting on a door of the vehicle, but preferably is mounted on the fender because of the advantages of such a mounting. Several advantages are realized by having the rear view mirror 3 mounted on the front fender rather than having it mounted on the door of a vehicle 15. By mounting the rear view mirror support 1 on the fender, it is not jarred when the doors open and shut, the operator of the vehicle can still use the mirror if the door is open, vibration of the rear view mirror 3 is reduced and the vehicle operator has better rear vision than when the mirror is mounted on the door. With the rear view mirror support 1 mounted as disclosed above, the operator of the vehicle 15 adjusts the rear view mirror 3 by pivoting same about the securing device 47 so that he can view the road behind the vehicle 15 and an object such as a trailer or boat that is being towed by the vehicle 15. When desired or no longer needed the rear view mirror support 1 is removed from the vehicle 15 to prevent same from striking objects such as the door frame of a garage.

It is to be understood that while we have illustrated and described certain forms of our invention, it is not to be limited to the specific forms or arrangement of parts herein described and shown.

What We claim and desire to secure by Letters Patent is:

1. An article mount structure for mounting on a wall having opposed and spaced apart upper and lower abutments:
   a. a frame means having spaced apart legs with one leg for positioning adjacent to and substantially parallel to said upper abutment, an elongate member extending between and connecting said spaced legs, said frame legs having free ends remote from said elongate member;
   b. brackets fixed to said one leg of the frame means in spaced apart relation for engaging said upper abutment;
   c. an elongate brace member having a lower end;
   d. a hook member on the lower end of said brace member for engaging the lower abutment of the wall;
   e. a securing member mounted on the brace member and the other leg of the frame means to hold the frame means and brace member in selected relation to position the other leg of the frame means relative to the wall;
   f. tensioning means engaging said frame means and said brace member below said securing member to apply force for holding the brackets and hook member engaged with said upper and lower abutments;
   g. an article and means mounting same at the free end of said other leg of the frame means.

2. An article mount as set forth in claim 1 including:
   a. a member associated with said elongate brace member and having engagement with said tensioning means to locate the point of engagement of the tensioning means with the brace member.

3. An article mount as set forth in claim 2 wherein:
   a. said tensioning means being an elongate resilient member having hooks secured to ends thereof, said hooks engaged over said one leg between said brackets;
   b. said brackets and said hook member having a protective coating for preventing marring of the wall when engaged therewith.

4. A rear view mirror structure for mounting on a vehicle front fender having a lower edge at a wheel opening and an abutment surface adjacent to and facing the hood comprising:
   a. a frame means having spaced apart legs with one leg for positioning adjacent to and substantially parallel to said abutment surface, an elongate member extending between and connecting said spaced legs; said frame legs having free ends remote from said elongate member;
   b. brackets fixed to said one leg of the frame means in spaced apart relation for engaging said fender;
   c. an elongate brace arm having a lower end;
   d. a hook member on the lower end of said brace arm for engaging a lower edge of a front fender at a wheel opening thereof;
   e. a connector member mounted on the brace arm and secured to the other leg of the frame means to hold the frame means and brace arm in a selected position;
   f. tensioning means engaging said one leg and said brace arm below said connector member to apply force holding the brackets and hook member engaged with said abutment surface and lower edge;
   g. a mirror and means mounting same at the free end of said other leg of the frame means.

5. A rear view mirror structure as set forth in claim 4 including:
   a. an elongate rigid strut having ends connected to the free ends of said frame means and cooperating therewith to provide rigidity thereto.

6. A rear view mirror structure as set forth in claim 5 wherein:
   a. said connector member is adjustably mounted on the brace member and holds the frame means and brace member in selected relation to position the other leg of the frame means relative to the front fender;
   b. holding means are secured to said connector member and depending therefrom and having engagement with said tensioning means to locate the point of engagement of the tensioning means with the brace arm.

7. A rear view mirror structure as set forth in claim 6 wherein:
   a. said tensioning means is an elongate resilient member extending around said arm;
   b. said resilient member has hooks secured to both ends thereof, said engagement of the resilient member with said one leg being by said hooks engaging thereover between said brackets.

8. A ream view mirror structure as set forth in claim 7 wherein:
   a. said frame means being generally U-shaped opening toward the rear of the vehicle;
   b. said brackets each having a flange portion depending therefrom extending between the hood and fender and engaging said abutment surface.

9. A rear view mirror structure as set forth in claim 4 including:
   a. holding means mounted on said connector member and depending therefrom adjacent said brace arm and cooperatively engaging said tensioning means for locating the point of engagement of the tensioning means with the brace arm; and wherein
   b. said connector member is operable for selectively allowing relative movement between said frame means and said brace arm for positioning the other leg of the frame means relative to the front fender and holding same in the selected position.

10. A rear view mirror structure as set forth in claim 4 including:
    a. a protective coating on said brackets and said hook member for preventing marring of the vehicle;
    b. a flange portion on each side bracket and depending between the hood and fender and engaging said abutment surface.

11. A rear view mirror structure as set forth in claim 9 wherein said holding means includes:
    a. an elongate generally U-shaped member having spaced apart leg members and a bight portion therebetween, said leg members being adjacent said brace arm and mounted on said connector member and each having a laterally extending bent portion adjacent the bight portion, said bent portions extending outwardly of said brace arm forming laterally extending eyelets with said brace arm; and wherein
    b. said tensioning means being an elongate resilient member extending through said eyelets and around said brace arm and having free ends secured to said frame means one leg.

* * * * *